(12) United States Patent
Hasei et al.

(10) Patent No.: US 6,655,119 B2
(45) Date of Patent: Dec. 2, 2003

(54) CUTTER BLADE FOR LAWN MOWER

(75) Inventors: Shoji Hasei, Wako (JP); Naoki Matsumoto, Wako (JP); Yasutomo Abe, Wako (JP); Tetsuo Iida, Wako (JP); Masanori Shin, Wako (JP); Hiromitsu Sasaki, Wako (JP); Kenzo Shimada, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 31 days.

(21) Appl. No.: 10/108,526

(22) Filed: Mar. 27, 2002

(65) Prior Publication Data

US 2002/0152736 A1 Oct. 24, 2002

(30) Foreign Application Priority Data

Apr. 19, 2001 (JP) .......................................... 2001-121477

(51) Int. Cl.$^7$ ............................................... A01D 34/63
(52) U.S. Cl. ........................ 56/295; 56/255; 56/DIG. 17
(58) Field of Search ........................ 56/17.5, 255, 295, 56/DIG. 17, DIG. 20

(56) References Cited

U.S. PATENT DOCUMENTS

| | | | | |
|---|---|---|---|---|
| 3,636,685 A | * | 1/1972 | Speckman ................... | 56/295 |
| 3,998,037 A | * | 12/1976 | Deans et al. .................. | 56/295 |
| 4,015,408 A | * | 4/1977 | Cornellier ..................... | 56/295 |
| 4,254,607 A | * | 3/1981 | Moore .......................... | 56/295 |
| 4,269,020 A | * | 5/1981 | Wolf ............................. | 56/295 |
| 4,297,831 A | * | 11/1981 | Pioch ........................... | 56/295 |
| 4,320,617 A | * | 3/1982 | Fedeli .......................... | 56/295 |
| 6,487,840 B1 | * | 12/2002 | Turner et al. ................. | 56/295 |

FOREIGN PATENT DOCUMENTS

| | | | | |
|---|---|---|---|---|
| EP | 430281 A1 | * | 6/1991 | .......... A01D/34/73 |
| JP | 2519253 | | 11/1992 | |

* cited by examiner

Primary Examiner—Thomas B. Will
Assistant Examiner—Meredith Petravick
(74) Attorney, Agent, or Firm—Adams & Wilks (57) ABSTRACT

A cutter blade for lawn mowers having an airlift curved from a cutting edge formed on a rotationally leading edge toward a rotationally trailing edge. The trailing edge of the airlift is shaped in a waveform comprising a plurality of protrusions and a plurality of depressions. The protrusion closest to an outer end where the centrifugal force is greatest during the rotation of the cutter blade, is greatest in width so as to improve the discharging capability of grass clippings. The depressions limit negative pressure generated rotationally behind the airlift. A plurality of vent holes formed in the airlift is arranged radially in lines.

3 Claims, 9 Drawing Sheets

FIG. 8A (COMPARATIVE EXAMPLE)

FIG. 8B (PRESENT EMBODIMENT)

FIG. 9

CUTTER BLADE FOR LAWN MOWER

FIELD OF THE INVENTION

This invention relates to a cutter blade mounted to an output shaft of an engine of a rotary lawn mower, for cutting grass by rotation of the output shaft and discharging grass clippings to the rear of the lawn mower.

BACKGROUND OF THE INVENTION

A cutter blade for lawn mowers is known from, for example, Japanese Utility Model Registration No. 2519253 entitled "Rotary Cutter Blade for Lawn Mower".

The known cutter blade has a middle mounting section to be fixed to an output shaft of an engine and a blade section extending from each longitudinal end of the mounting section. The blade section has a cutting edge for cutting grass on its rotationally leading edge. The blade section further includes an angled section with a rotationally trailing edge extending in a rear upward direction with inclination, for producing airflow for discharging grass clippings. The cutting edge splits airflow into two flows along the front surface and the back surface of the angled section. As the rotational speed of the cutter blade increases, the airflow along the back surface of the angled section tends to soon divert from the surface. In order to reduce rotational noise by preventing such airflow diversion, the angled section is formed with a plurality of elongate vent holes.

It is a common art for rotary lawn mowers to provide an angled section to a rotary cutter blade for discharging grass clippings. The provision of the angled section generates a negative pressure (vacuum region) behind the angled section. The negative pressure causes the airflow to divert, generating rotational noise. In order to reduce the rotational noise, the angled section is formed with a plurality of elongate vent holes as described above to thereby reduce the negative pressure generated behind the angled section.

However, further reduction of noise caused by lawn mowers is necessary for environmental improvements.

SUMMARY OF THE INVENTION

The present invention provides a cutter blade for lawn mowers, capable of generating sufficient airflow for discharging grass clippings and reducing rotational noise.

According to an aspect of the present invention, there is provided a cutter blade for a lawn mower with a motor, which comprises: a mounting section mountable to an output shaft of the motor and extending radially outward in opposite directions from the mounted portion; a cutting edge formed on a rotationally leading edge on each side of the mounting section; and an airlift curved from the cutting edge to a rotationally trailing edge and having a plurality of vent holes; wherein, the trailing edge is shaped in a waveform comprising a plurality of protrusions and a plurality of depressions formed between the protrusions, the one of the plurality of protrusions closest to an outer end of the cutter blade is greatest in width; and the plurality of vent holes are elongate holes arranged in lines extending from the vicinity of the protrusions of the trailing edge toward the leading edge.

Rotation of the cutter blade of the present invention generates a negative pressure (vacuum region) rotationally behind the airlift. Since the negative pressure causes rotational noise, the vent holes are provided in the airlift to reduce the negative pressure. The waveform of the trailing edge prompts the reduction of the negative pressure, reducing vortices, thereby reducing noise generated by the rotation of the cutter blade. For example, of the constituents of the waveform, the protrusions increase the function of swirling up grass clippings while the depressions weaken the swirling-up function. As compared with a case where the protrusions have an equal width, providing the greatest width to the protrusion positioned closest to the outer end of the cutter blade where the centrifugal force is greatest, improves the function of swirling up grass clippings.

Further, the vent holes arranged in lines formed in the airlift reduce the negative pressure in the vicinity of the rear surface of the protrusions of the airlift where the negative pressure is most intense. This directly reduces the negative pressure where it is most intense, limiting the rotational noise of the cutter blade.

When the vent holes in lines are arranged in an arc in parallel with a rotation circle of the cutter blade, the vent holes always face the rotation direction during the rotation of the cutter blade without interrupting airflow, limiting the rotational noise of the cutter blade. Each line of the vent holes comprises a plurality of vent holes in an embodiment.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
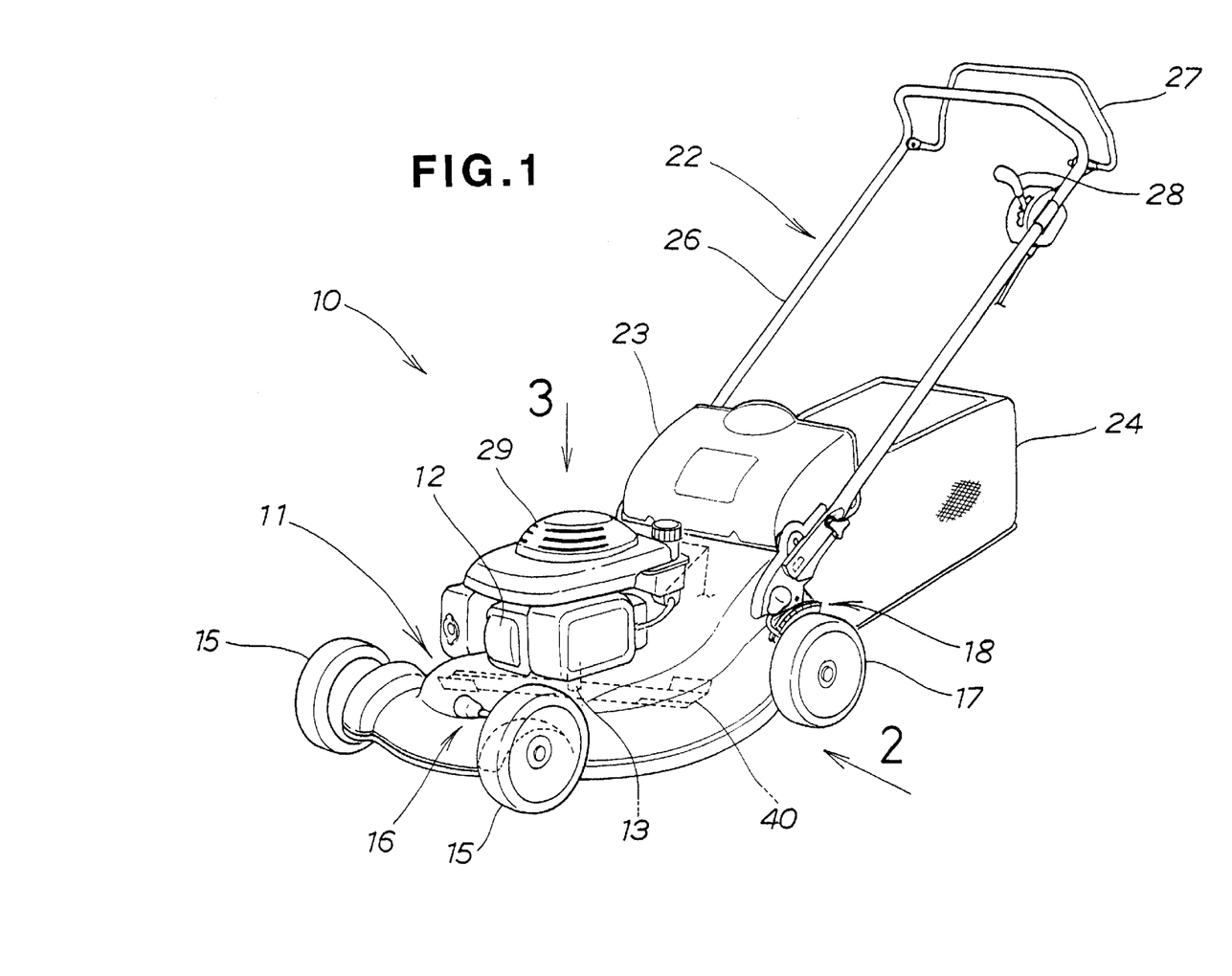
FIG. 1 is a perspective view of a lawn mower with a cutter blade according to the present invention.
Figure 2:
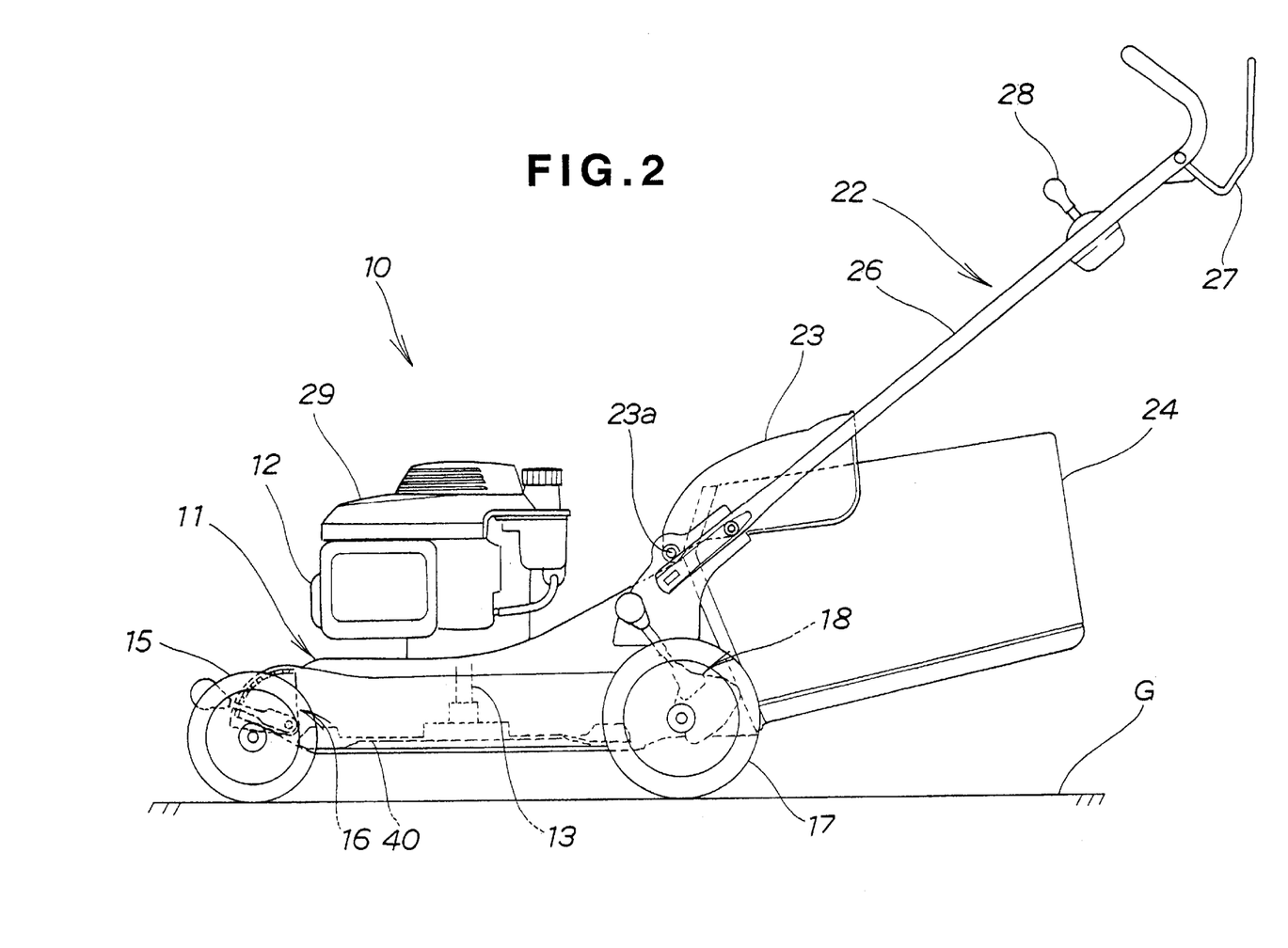
FIG. 2 is a side view of the lawn mower taken from the direction of arrow "2" in FIG. 1.
Figure 3:
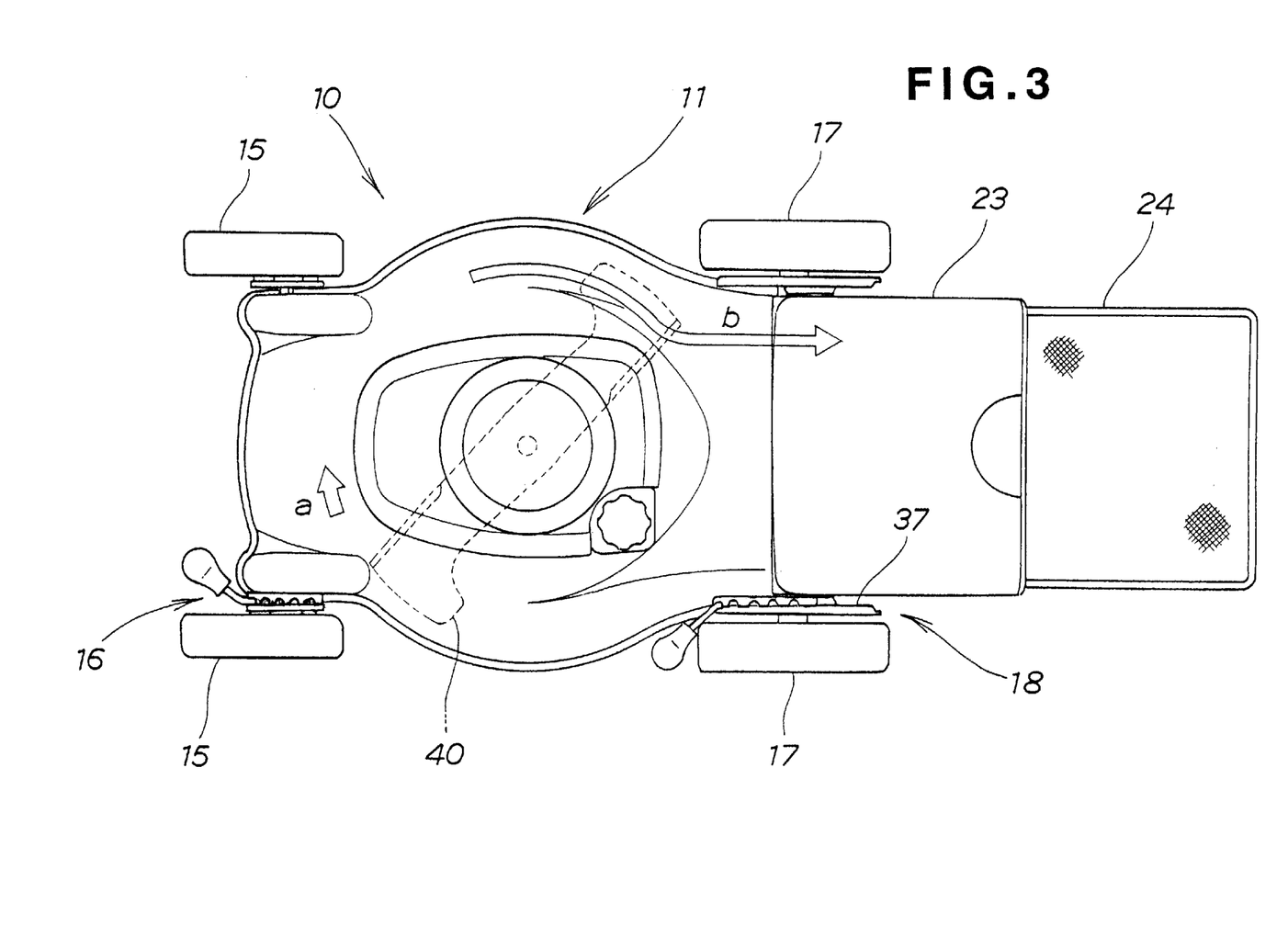
FIG. 3 is a plan view of the lawn mower taken from the direction of arrow "3" in FIG. 1.

FIGS. 1, 2 and 3 show a lawn mower using a cutter blade according to the present invention.

A lawn mower 10 illustrated in the present embodiment is a self-propelled lawn mower with an engine 12 to rotate a cutter blade 40 and drive a pair of rear wheels 17, 17. A motor 12 in the form of an engine is mounted to a housing 11. The cutter blade 40 is fixed to an output shaft 13 of the engine 12, and rotates to cut grass and discharges grass clippings into a grass bag 24.

A pair of front wheels 15, 15 is mounted to the housing 11 in a vertically movable manner. The front wheels 15, 15 are adjusted in height by a front wheel height adjustment mechanism 16 mounted to the housing 11. The rear wheels 17, 17 are mounted to the housing 11 in a vertically movable manner, and adjusted in height by a rear wheel height adjustment mechanism 18 mounted to the housing 11. The adjustment in height of the front wheels 15, 15 and the rear wheels 17, 17 by the front and rear wheel height adjustment mechanisms 16, 18 sets a distance between the ground G and the cutter blade 40, thereby adjusting the height of grass to be cut.

An operating handle 22 is mounted to extend from the rear of the housing 11 in a rear upward direction. A grass bag 24 for receiving grass clippings is demountably mounted to the rear of the housing 11. A bag cover 23 covering an opening of the grass bag 24 through which to take out grass clippings is openably/closably mounted around a shaft 23a to the rear of the housing.

The operating handle 22 has a handle body 26 provided with a cutter lever 27 and a speed change lever 28. The engine 12 is started by pulling an engine start cable not shown. Raising the cutter lever 27 rotates the cutter blade 40. The lawn mower 10 is self-propelled when the speed change lever 28 is set in a forward position. Reference numeral 29 denotes a head cover for the engine 12.

Referring to FIG. 3, the cutter blade 40 is rotated as shown by arrow "a" to cut grass, generating airflow as shown by arrow "b" within the housing 11, and thereby blowing the grass clippings into the grass bag 24.

Next, the configuration of the cutter blade 40 will be described with reference to FIGS. 4 to 6.

Figure 4:
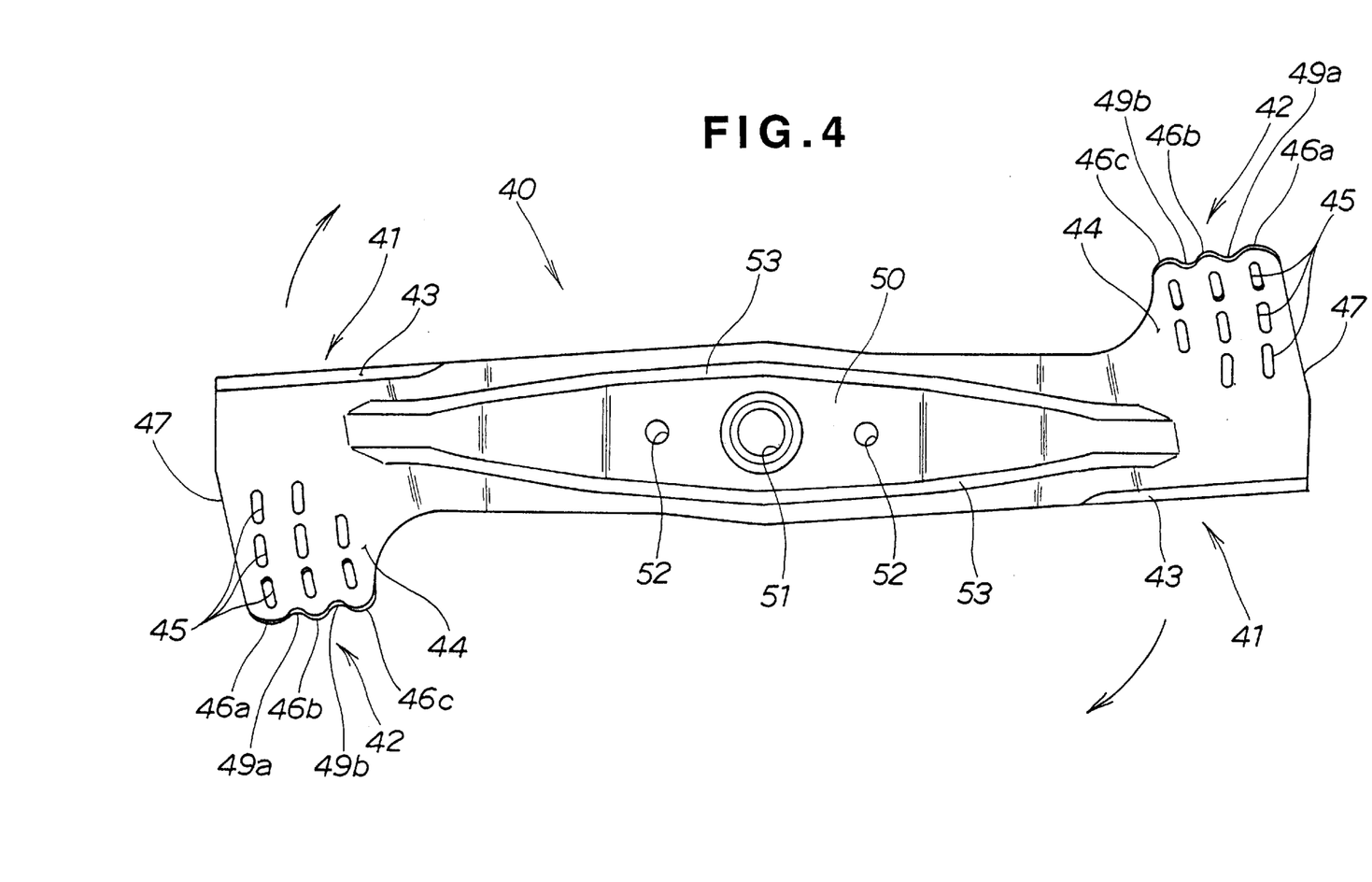
FIG. 4 is a plan view of the cutter blade according to the present invention.
Figure 5:
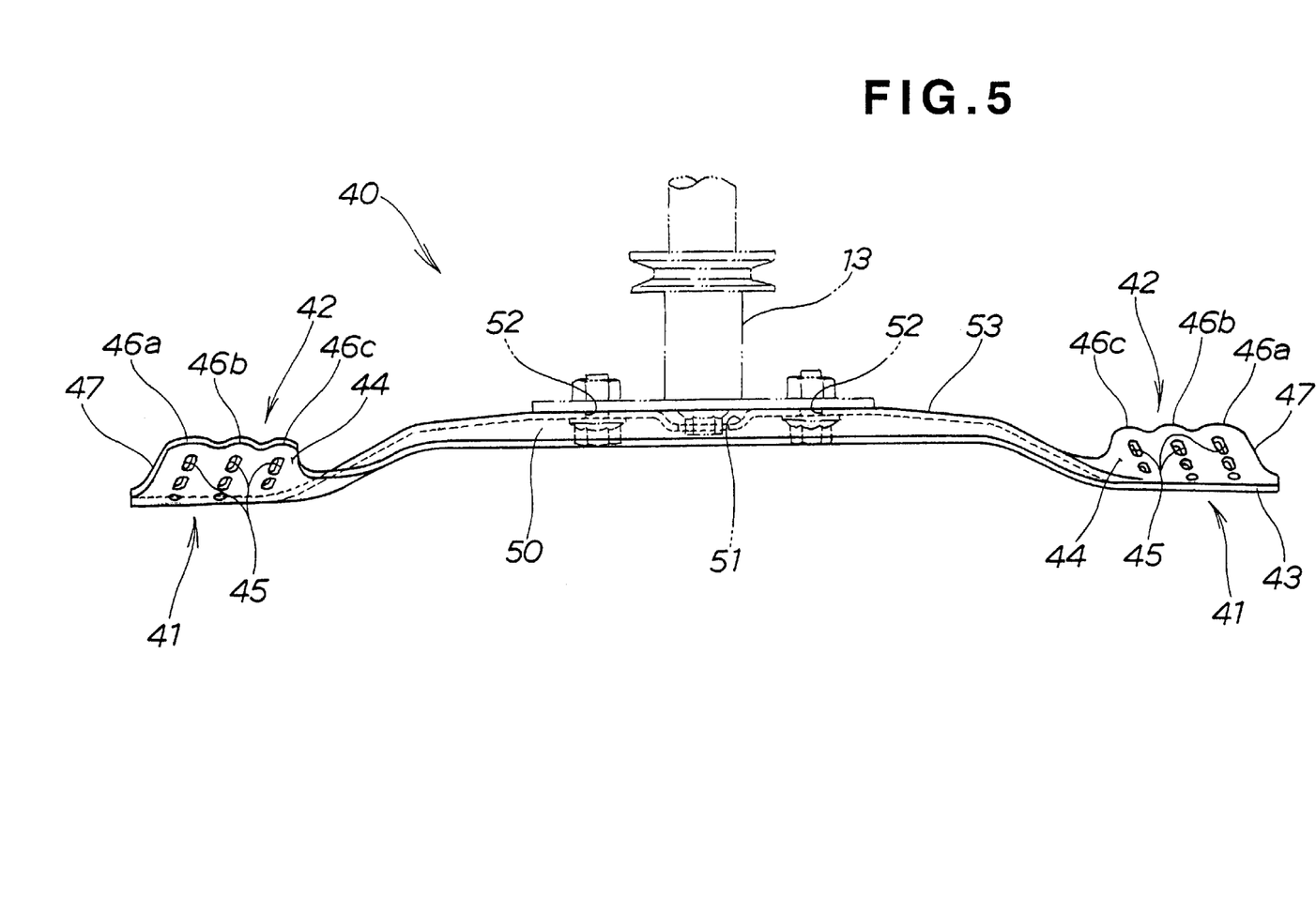
FIG. 5 is a front view of the cutter blade shown in FIG. 4.

In FIGS. 4 and 5, the cutter blade 40 is generally of an elongate plate shape. The cutter blade 40 has a mounting section 50 to be mounted to the output shaft 13 and extending radially outward in opposite directions from its mounted portion to the output shaft 13, and an airlift 44 positioned at each end of the mounting section 50. The airlift 44 is formed with a cutting edge 43 on a leading edge 41 in the rotation direction of the cutter blade 40. The airlift 44 is curved upward from the cutting edge 43 toward a trailing edge 42 in the rotation direction of the cutter blade 40, so as to guide grass cut by the cutting edge 43 upward. The airlift 44 has a plurality of vent holes 45 arranged along the trailing edge 42 and forming plural lines with other vent holes 45. The vent holes 45 reduce a negative pressure (vacuum region) generated behind the airlift 44 in the rotation direction of the cutter blade 40.

The trailing edge 42 of the airlift 44 is shaped in a waveform with a plurality of protrusions 46a, 46b and 46c and a plurality of depressions 49a and 49b formed between the protrusions. Among these protrusions, the protrusion 46a closest to an outer end 47 of the cutter blade 40 is greatest in width. The greatest width of the protrusion 46a closest to the rotationally outer end 47 where the greatest centrifugal force is generated during the rotation of the cutter blade 40, increases the generation of airflow at the protrusion 46a, thereby improving conveyance of grass clippings. The vent holes 45 are elongate holes extending from the vicinity of the protrusions 46a, 46b and 46c of the trailing edge 42 toward the leading edge 41.

Reference numeral 51 denotes a recess for the output shaft 13 when fixing the cutter blade 40 to the output shaft 13. Reference numerals 52, 52 denote mounting holes for mounting the cutter blade 40 to the output shaft 13 via bolts and nuts. Reference numeral 53 denotes a rib for reinforcing the cutter blade 40.

Figure 6:
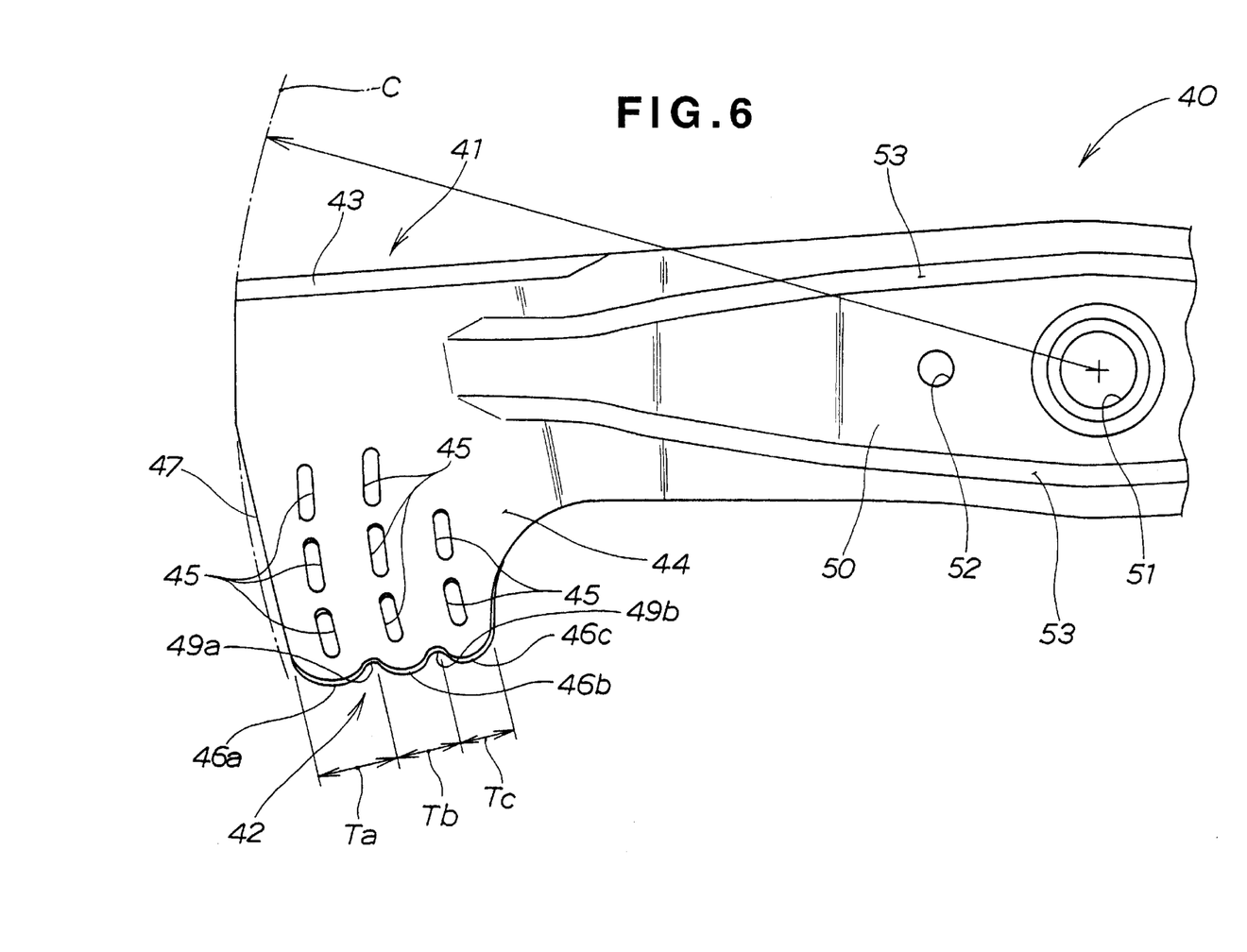
FIG. 6 is an enlarged view of a cutting edge and an airlift of the cutter blade shown in FIG. 4.

As shown in FIG. 6, the relationship in width between the protrusions 46a, 46b and 46c is defined as Ta>Tb>Tc in which Ta, Tb and Tc respectively indicate the widths of the protrusions 46a, 46b and 46c constituting the waveform shape of the trailing edge 42 of the airlift 44.

Of the constituents of the waveform shape, the protrusions 46a, 46b and 46c reinforce the function of swirling grass clippings upward while the depressions 49a and 49b weaken the upward-swirling function. As compared with a case where the protrusions and the depressions are disposed evenly, the provision of the greatest width Ta to the protrusion 46a closest to the outer end of the cutter blade 40 where the centrifugal force is greatest as described above improves the swirling-up function.

Forming the vent holes 45 in elongate holes extending from the vicinity of the protrusions 46a, 46b and 46c toward the leading edge 41 reduces negative pressure in the vicinity of the protrusions 46a, 46b and 46c where the negative pressure is most intense. This directly reduces the negative pressure where the negative pressure is most intense, and limits the rotational noise of the cutter blade 40.

The vent holes 45 formed in the airlift 44 are arranged in an arc concentric with a rotation circle "C" of the cutter blade 40. Thus the vent holes 45 are always in such a position as to face the rotation direction of the cutter blade 40 without interrupting airflow generated by the rotation of the cutter blade 40, thereby limiting noise caused by the rotation of the cutter blade 40.

Next, the operation of the cutter blade 40 will be described with reference to FIGS. 7, 8 and 9.

Figure 7:
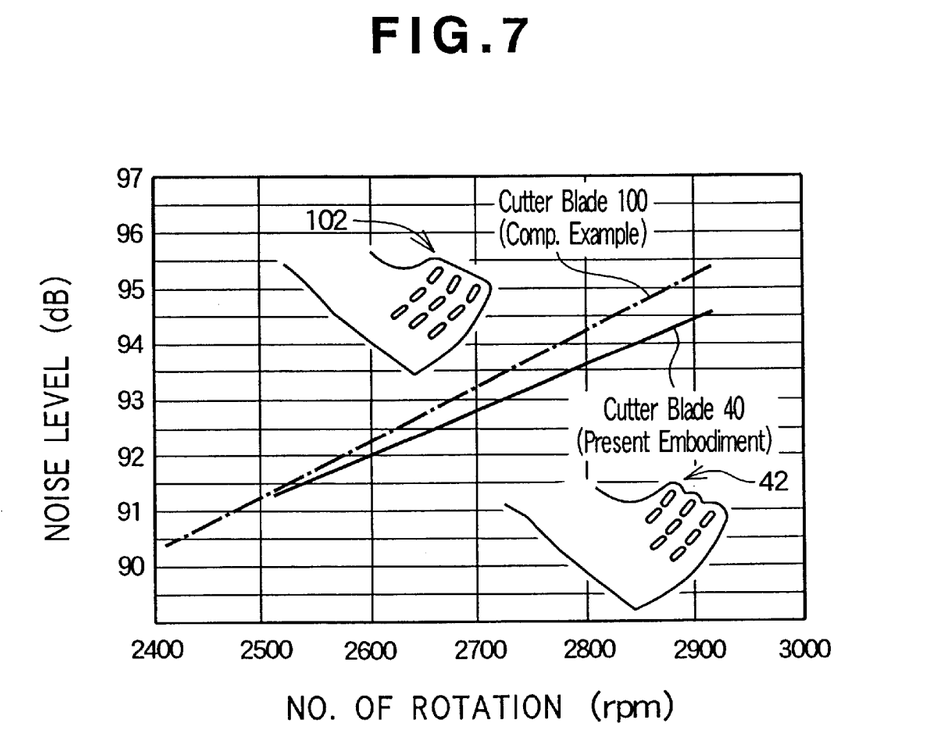
FIG. 7 shows a graph of comparison in noise level with respect to rpm between the cutter blade of the present invention and a cutter blade of a comparative example with a linear trailing edge.

FIG. 7 shows a graph of comparison in noise level with respect to rpm between the cutter blade 40 in the present embodiment and a cutter blade 100 in a comparative example with a linear trailing edge 102. Here, the noise level means a sound pressure level weighted with frequency characteristics under the noise level measuring method specified by JIS Z 8731.

Both the cutter blades 40 and 100 linearly increase in noise level with the increase in rpm. A normal rotational speed as the most suitable rotational speed for lawn mowers is 2900 rpm. In the comparison at 2900 rpm between the present embodiment and the comparative example, the noise level of the present cutter blade 40 is about 94.5 dB, and that of the comparative example cutter blade 100 is about 95.3 dB. That is, the present cutter blade 40 with the trailing edge 42 shaped in a waveform is more effective in reducing the rotational noise by 0.8 dB as compared with the cutter blade 100 of the comparative example with the trailing edge 102 shaped linearly.

Next, airflows with respect to the present cutter blade 40 and the comparative example cutter blade 100 will be described with reference to FIGS. 8A and 8B. FIG. 8A illustrates the comparative example, in which figure (b) is a view taken from the direction of arrow "b" in figure (a). FIG. 8B illustrates the present embodiment, in which figure (b) is a view taken from the direction of arrow "b" in figure (a).

Figure 8A:
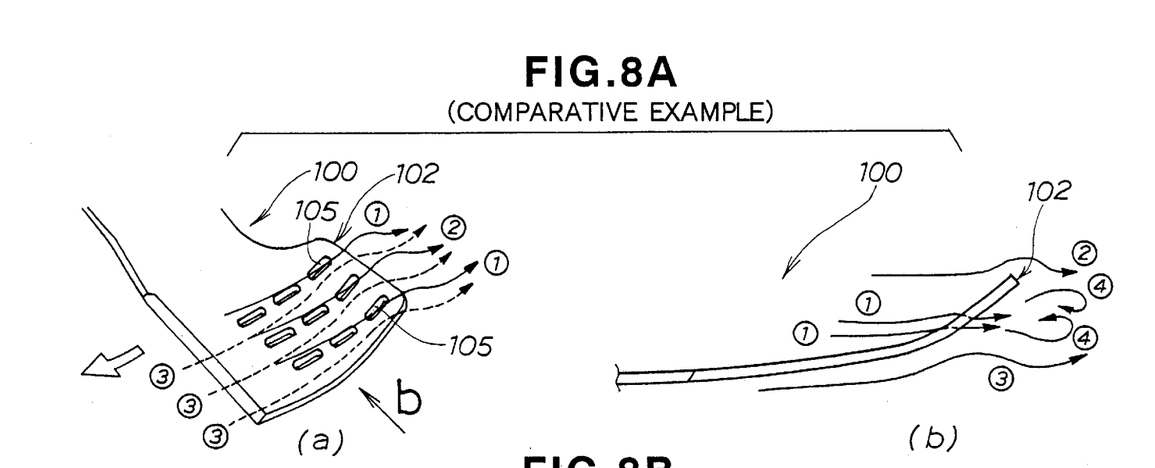
FIGS. 8A and 8B are diagrams showing comparison in airflow between the cutter blade of the present invention and the cutter blade of the comparative example.

In FIG. 8A(a), the rotation of the comparative example cutter blade 100 as shown by an arrow causes airflow above the cutter blade 100 as shown by arrows ①, ① and an arrow ②, and causes airflow behind the cutter blade 100 as shown by arrows ③. Here the arrows ①, ① indicate the flow of air passing through vent holes 105 of the cutter blade 100, and the arrow ② indicates the flow of air passing over the trailing edge 102 of the cutter blade 100.

In FIG. 8A(b), air passes the vent holes 105 shown in (a) as shown by arrows ①, ①. However, airflow shown by arrow ③ increases negative pressure behind the cutter blade 100, generating vortices as shown by arrows ④, ④, and leading to an increase in rotational noise.

Figure 8B:
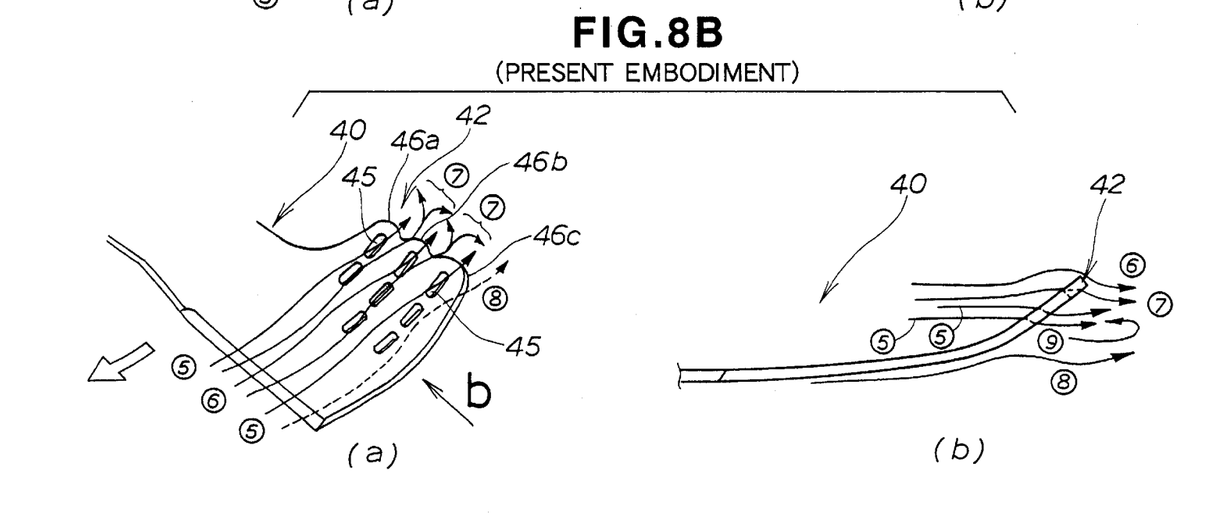

In FIG. 8B(a), the rotation of the present cutter blade 40 as shown by an arrow causes airflow above the cutter blade 40 as shown by arrows ⑤, ⑤, arrow ⑥, and arrows ⑦, and causes airflow behind the cutter blade 40 as shown by arrow (a. Here the arrows ⑤, ⑤ indicate the flow of air passing through the vent holes 45 of the cutter blade 40, the arrow if indicates the flow of air passing over the protrusion 46b of the cutter blade 40, and arrows ⑦, ⑦ indicate the flow of air passing through the depressions 49a and 49b as shown in FIG. 6 formed between the protrusions 46a, 46b and 46c.

In FIG. 8B(b), negative pressure is generated behind the cutter blade 40, generating a vortex as shown by an arrow ⑨ behind the cutter blade 40. However, as shown by an arrow ⑦, airflow through the depressions 49a and 49b shown in FIG. 6 formed between the protrusions 46a, 46b and 46c shown in FIG. 8B(a), decreases the negative pressure behind the cutter blade 40. That is, the airflow shown by the arrow ⑦ cancels part of the airflow shown by the arrows ④ in FIG. 8A(b). Accordingly, the vortex shown by the arrow ⑨ can be limited, resulting in the reduction of rotational noise.

Figure 9:
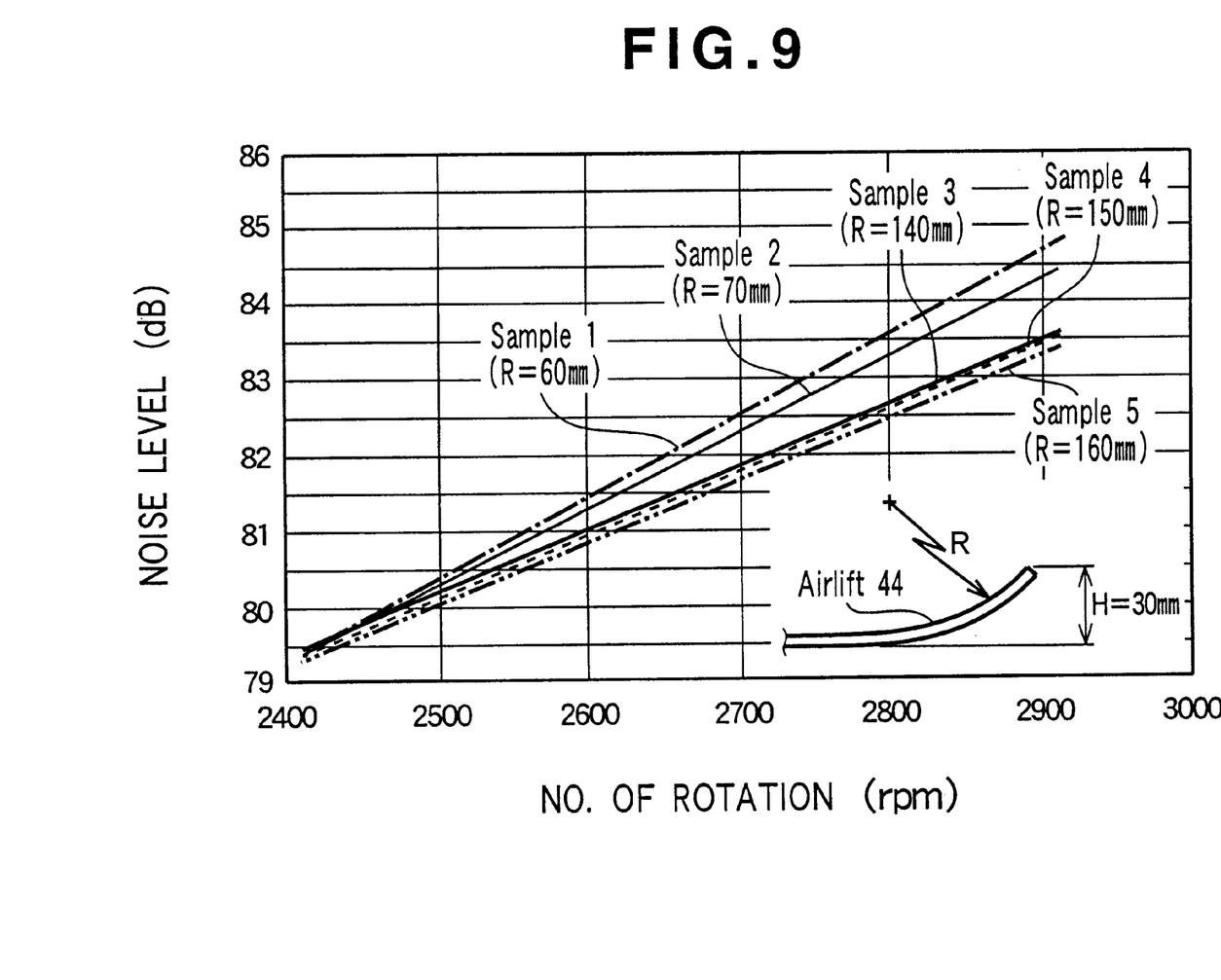
FIG. 9 is a graph of noise level with respect to rpm resulted from examinations in which a radius of curvature of a curved airlift is changed with the height of the airlift fixed.

FIG. 9 shows change in rotational noise when the curvature radius R of the airlift 44 is changed with the height H of the airlift 44 fixed (at 30 mm). Here, the curvature radius R in sample 1 is 60 mm, 70 mm in sample 2, 140 mm in sample 3, 150 mm in sample 4, and 160 mm in sample 5.

In samples 1 to 5, noise level linearly increases as rpm increases.

In samples 1 to 3 (R=60, 70, 140), noise level is decreased as the curvature radius R of the airlift 44 increases. This would be because the increased curvature radium R allows grass clippings and air to relatively softly strike the airlift 44.

In samples 3 to 5 (R=140, 150, 160), little difference is found in noise level, and the curvature radius R has little effect. This indicates when R=140 mm or more, the resistance of grass clippings and air against the airlift is saturated.

From the above description, it is preferred to set the curvature radius R of the airlift 44 within 140 mm to 150 mm. That is, the curvature radius R below 140 mm causes increase in rotational noise, and the curvature radius R exceeding 150 mm prevents the airlift 44 from sufficiently swirling grass clippings upward. Setting the curvature radius R of the airlift 44 within 140 mm to 150 mm improves the discharge and conveyance of grass clippings, reducing air diversion, thereby avoiding increase in air resistance.

In the present embodiment, the relationship in width between the protrusions 46a, 46b and 46c is defined as Ta>Tb>Tc as shown in FIG. 6. The present invention is not limited thereto, and the relationship in width between the protrusions 46a, 46b and 46c may be defined as Ta>Tb=Tc. Further, the present embodiment has been described with the three protrusions 46a, 46b, and 46c, but the number of protrusions is not limited to three, and may be 2, 4 or more in the present invention.

The present disclosure relates to the subject matter of Japanese Patent Application No. 2001-121477, filed Apr. 19, 2001, the disclosure of which is incorporated herein by reference in its entirety.

What is claimed is:

1. A cutter blade for a lawn mower with a motor, comprising:

a mounting section mountable to an output shaft of said motor and extending radially outward in opposite directions from the mounted portion;

a cutting edge formed on a rotationally leading edge on each side of said mounting section; and an airlift curved from said cutting edge to a rotationally trailing edge and having a plurality of vent holes; wherein, said trailing edge is shaped in a waveform comprising a plurality of protrusions and a plurality of depressions formed between said protrusions, the one of said plurality of protrusions closest to an outer end of said cutter blade is greatest in width; and said plurality of vent holes are elongate holes arranged in lines extending from the vicinity of said protrusions of said trailing edge toward said leading edge.

2. A cutter blade as set forth in claim 1, wherein:

said plurality of vent holes arranged in lines are arranged in an arc in parallel with a rotation circle of said cutter blade.

3. A cutter blade as set forth in claim 1, wherein:

each line of said vent holes comprises a plurality of vent holes.

* * * * *